(12) United States Patent
Kim

(10) Patent No.: US 9,448,664 B2
(45) Date of Patent: Sep. 20, 2016

(54) TOUCH DETECTION METHOD AND TOUCH DETECTION APPARATUS HAVING BUILT UP LINEARITY

(71) Applicant: CRUCIALTEC CO., LTD., Chungcheongnam-do (KR)

(72) Inventor: Dong Woon Kim, Seoul (KR)

(73) Assignee: CRUCIALTEC CO., LTD., Chungcheongnam-do (KR)

( * ) Notice: Subject to any disclaimer, the term of this patent is extended or adjusted under 35 U.S.C. 154(b) by 0 days.

(21) Appl. No.: 14/381,205

(22) PCT Filed: Feb. 27, 2013

(86) PCT No.: PCT/KR2013/001600
§ 371 (c)(1),
(2) Date: Aug. 26, 2014

(87) PCT Pub. No.: WO2013/129849
PCT Pub. Date: Sep. 6, 2013

(65) Prior Publication Data
US 2015/0009179 A1  Jan. 8, 2015

(30) Foreign Application Priority Data
Feb. 28, 2012 (KR) .................. 10-2012-0020474

(51) Int. Cl.
*G06F 3/045* (2006.01)
*G06F 3/041* (2006.01)
*G06F 3/044* (2006.01)

(52) U.S. Cl.
CPC ............. *G06F 3/0418* (2013.01); *G06F 3/044* (2013.01); *G06F 3/0416* (2013.01)

(58) Field of Classification Search
CPC ...... G06F 3/0418; G06F 3/044; G06F 3/0416
USPC .......................................................... 345/174
See application file for complete search history.

(56) References Cited

U.S. PATENT DOCUMENTS

2013/0181946 A1 * 7/2013 Lee ............................... 345/174

FOREIGN PATENT DOCUMENTS

| KR | 10-2007-0016684 A | 2/2007 |
|----|-------------------|--------|
| KR | 10-2007-0064769 A | 6/2007 |
| KR | 10-2010-0048236 A | 5/2010 |
| KR | 10-1085088 B1     | 11/2011 |

OTHER PUBLICATIONS

International Search Report for PCT/KR2013/001600.

* cited by examiner

*Primary Examiner* — Gustavo Polo
(74) *Attorney, Agent, or Firm* — H.C. Park & Associates, PLC

(57) ABSTRACT

A touch detection apparatus includes a sensor pad to output a signal based on a touch state in response to an alternating voltage in a floating state after being charged, an operational amplifier including a first input connected to an output of the sensor pad and a second input to receive the alternating voltage, a level shift detection unit to detect a touch signal based on a difference between a voltage variation at an output end of the operational amplifier caused by the alternating voltage and a voltage variation at the output end of the operational amplifier caused by occurrence of a touch, and a switching unit including a first switch to control an electric potential between a first input and the output end of the operational amplifier and a second switch to connect or not the sensor pad and the first input of the operational amplifier.

8 Claims, 9 Drawing Sheets

TOUCH DETECTION METHOD AND TOUCH DETECTION APPARATUS HAVING BUILT UP LINEARITY

CROSS REFERENCE TO RELATED APPLICATIONS AND CLAIM OF PRIORITY

This patent application is a National Phase application under 35 U.S.C. §371 of International Application No. PCT/KR2013/001600, filed 27 Feb. 2013, which claims priority to and the benefit of Korean Patent Application No. 10-2012-0020474, filed 28 Feb. 2012, entire contents of which are incorporated herein by reference.

BACKGROUND

1. Technical Field

This application generally relates a touch detection method and a touch detection apparatus, and more particularly, to a touch detection method and a touch detection apparatus for detecting a touch area and touch coordinates by detecting a touch signal.

2. Background Art

A touch screen panel is an input device that receives a user input based on contents displayed by an image display apparatus by touching the touch screen panel with a hand of a human or other touch means.

The touch screen panel is located in a front face of an image display apparatus and converts a contact position of the touch screen panel, at which the contact is made by a hand or other contact means, into an electric signal. Therefore, an instruction selected at the contact position is accepted as an input signal.

In general, the touch screen panel is implemented by a resistive method, an optical detection method, and a capacitive method for detecting a touch. A capacitive touch screen panel converts a contact position into an electric signal by detecting change in capacitance formed between a conductive detection pattern and nearby another detection pattern or a ground electrode when a hand or an object makes contact with the touch screen panel.

FIG. 1 is an exploded plan view illustrating an example of a conventional capacitive touch screen panel.

Referring to FIG. 1, a touch screen panel 1 includes a transparent substrate 2, and further a first sensor pattern layer 3, a first insulating layer 4, a second sensor pattern layer 5, a second insulating layer 6, and a metal interconnection 7 that are sequentially formed on the transparent substrate 2.

The first sensor pattern layers 3 may be connected in a row direction on the transparent substrate 2, for example, the first sensor pattern layers 3 may be provided in a regular pattern having a plurality of diamond forms aligned. The first sensor pattern layers 3 located on a single row with the same Y coordinate are connected to each other, thereby forming a plurality of Y patterns, and the first sensor pattern layers 3 are connected to the metal interconnection 7 in units of rows.

The second sensor pattern layers 5 may be connected in a column direction on the first insulating layer 4, for example, the second sensor pattern layers 5 may be provided in a regular pattern having a plurality of diamond forms in the same manner as the first sensor pattern layers 3. The second sensor pattern layers 5 located on a single column with the same X coordinate are connected to each other, and alternatingly disposed with the first sensor pattern layer 3 without overlapping the first sensor pattern layers 3. In addition, the second sensor pattern layers 5 are connected to the metal interconnection 7 in units of columns.

The first and second sensor pattern layers 3 and 5 may be formed of a transparent conducting material, such as indium tin oxide (ITO), and the first insulating layer 4 may be formed of a transparent insulating material.

Each of the sensor pattern layers 3 and 5 is electrically connected to a driving circuit through the metal interconnections 7.

When a finger of a human or a contact means makes contact with the touch screen panel 1, a change in capacitance based on a contact position is transmitted to the driving circuit through the first and second sensor pattern layers 3 and 5 and the metal interconnection 7. The transmitted change in capacitance is converted into an electric signal by X and Y input processing circuits so that the contact position is recognized.

However, the touch screen panel 1 needs to be additionally provided with ITO patterns formed on the respective sensor pattern layers 3 and 5, and the insulating layer 4 needs to be provided between the sensor pattern layers 3 and 5, which causes the thickness of the touch screen panel 1 to be increased.

Since the conventional touch detection is achieved by accumulating a plurality of times of changes in the capacitance that arises to a small degree, the capacitance change needs to be detected at a high frequency, and thus a complicated operation and statistical processing processes are required.

In addition, in order to sufficiently accumulate the change in capacitance for a predetermined period of time, a low resistance needs to be maintained and thus a metal interconnection is required. Such a metal interconnection causes a bezel at a rim of a touch screen to be thicker, and requires an additional mask process.

FIG. 2 is an equivalent circuit for detecting a touch at the time of occurrence of a touch.

FIG. 2 shows an equivalent circuit for a capacitive touch detection method in which a touch is detected by measuring a level shift.

Referring to FIG. 2, a finger makes contact with a sensor pattern, Cvcom, Cdrv, Cp, Ct, and so on are generated. Since the touch screen panel recognizes a touch by detecting the amount of change in Ct, Cp, Cvcom, and so on act as noise.

In addition, the touch screen panel applies a clock signal, such as an alternating voltage Vdrv, to the sensor pattern and applies a variation detected by the sensor pattern, that is, an output of the sensor pattern to an input of an Analogue to Digital Converter (ADC), to acquire an output value. Accordingly, a voltage variation at an output end of the sensor pattern at the time of occurrence of a touch on the touch screen panel is determined by Formula 1 below.

$$\Delta V_o = \pm (V_{drvH} - V_{drvL}) \left( \frac{C_{drv}}{C_{drv} + C_p + C_t} \right) \quad \text{[Formula 1]}$$

$\Delta Vo$ is a voltage variation at a sensor pattern, VdrvH is a high level voltage of an alternating voltage Vdrv, VdrvL is a low level voltage of an alternating voltage Vdrv, Cdrv is a driving capacitance, Cp is a parasitic capacitance, and Ct is a touch capacitance.

Since Ct is placed at a site of a denominator in Formula 1, $\Delta Vo$ is increased with increase of Ct. However, the increase in $\Delta Vo$ does not have a perfect linearity.

The difference of voltage variations $\Delta V_o$ before and after a touch corresponds to a touch area, and as seen in FIG. 2 that touch coordinates are obtained by use of the touch area, touch coordinates are more easily obtained if the linearity is ensured.

To this end, a table may be configured to map ADC output values to Ct values in one to one correspondence, and the Ct value may be obtained by look-up of ADC results. However, since the Cp values are different at respective touch nodes, the table needs to be configured for each node and the size of a memory consumed to configure the table is increased, which causes drawbacks in terms of system performance and cost of the overall system. In addition, since the time taken to configure the table is long, the driving time of the system may be delayed.

SUMMARY

The present invention provides a touch detection method and a touch detection apparatus allowing a level shift value and a touch capacitance to have a linear relationship with each other.

According to an aspect of the present invention, there is provided a capacitive touch detection apparatus including: at least one sensor pad configured to output a signal based on a touch state in response to an alternating voltage in a floating state after being charged with an electric charge; an operational amplifier including a first input connected to an output of the sensor pad and a second input configured to receive the alternating voltage; a level shift detection unit configured to detect a touch signal based on a difference between a voltage variation at an output end of the operational amplifier caused by the alternating voltage and a voltage variation at the output end of the operational amplifier caused by occurrence of a touch; and a switching unit including a first switch configured to control an electric potential between the first input and the output end of the operational amplifier and a second switch configured to connect or not the sensor pad and the first input of the operational amplifier.

The switching unit makes a difference between the voltage variations to have linearity with a touch capacitance by switching on or off the first switch and the second switch.

The operational amplifier further include a driving capacitance between the output end and the first input of the operational amplifier.

The switching unit may further include a control unit configured to control the plurality of switches, and the control unit may control the second switch to be switched off when the first switch is in an ON state, and control the second switch to be switched on when the first switch is in an OFF state.

A touch area on the sensor pad may be measured based on the difference in the voltage variations.

The sensor pad may be disposed in the form of an isolated matrix, and touch coordinates may be calculated from a region formed by the touch area.

According to another aspect of the present invention, there is provided a touch detection method including: (a) charging at least one sensor pad that forms a touch capacitance in cooperation with a touch means, and floating the sensor pad; (b) charging or discharging an initial electric charge in a driving capacitance whose connection with the sensor pad is switched; (c) connecting the sensor pad to the driving capacitance and applying an alternating voltage that alternates at a predetermined frequency to the sensor pad; and (d) measuring a difference between a voltage variation caused by the alternating voltage at the time of non-occurrence of a touch and a voltage variation caused by the alternating voltage at the time of occurrence of a touch.

The difference in the voltage variations is made a linear relationship with a touch capacitance by controlling as a plurality of switches.

The touch detection method may further include calculating a touch area based on the linear relationship.

According to the above-described aspects of the present invention, when a change in capacitance is converted into a digital value, the converted value is allowed to be linear with a touch capacitance, therefore an additional circuit for improving linearity is not needed, and the cost and power consumption incurred for the system can be reduced.

According to the above-described aspects of the present invention, the touch detection apparatus can easily acquire an output value having linearity, and thus the precision in calculating the position and size of a touch can be improved.

DETAILED DESCRIPTION

Figure 1:
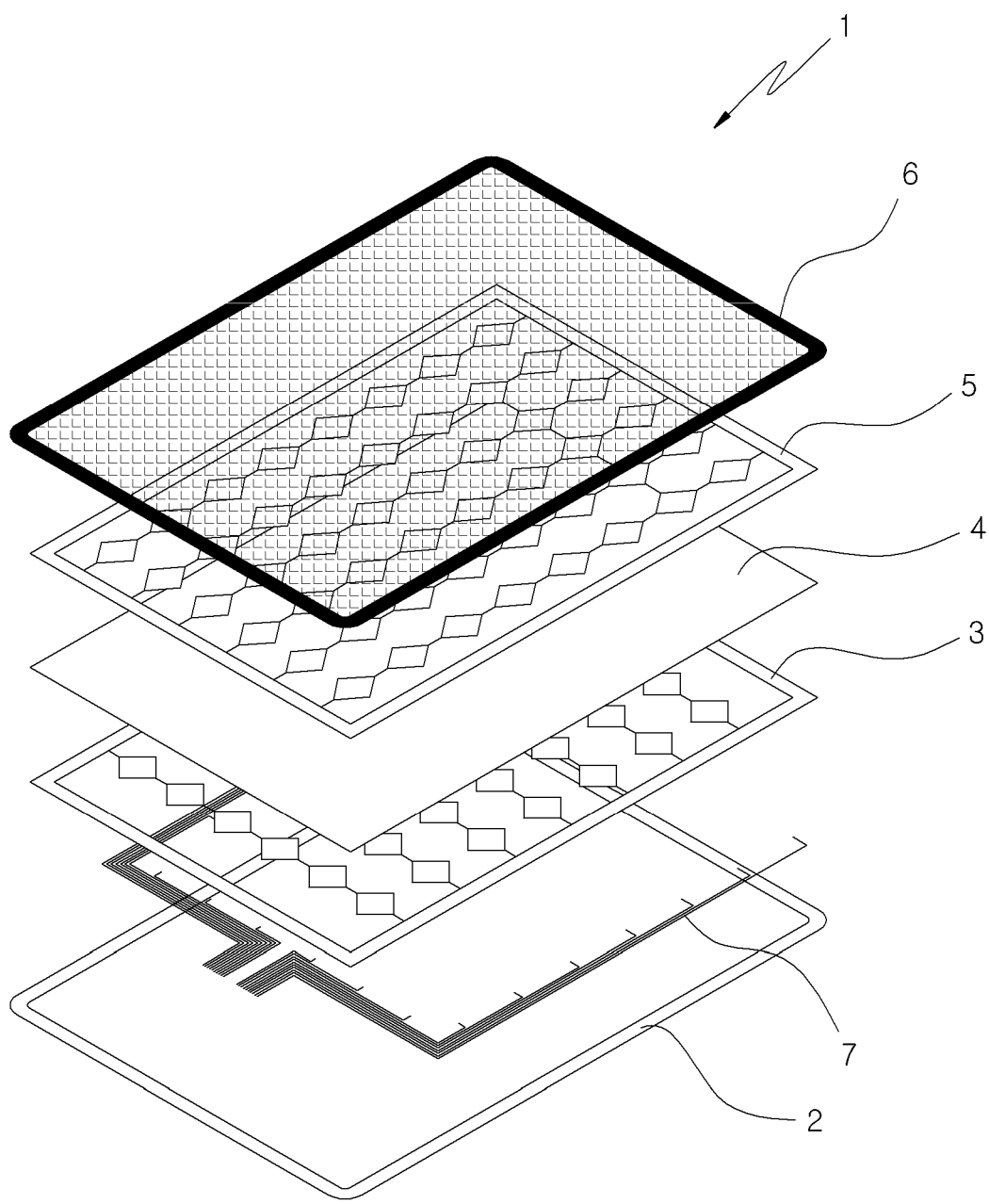
FIG. 1 is an exploded plan view illustrating an example of a capacitive touch screen panel in accordance with the conventional technology.
Figure 2:
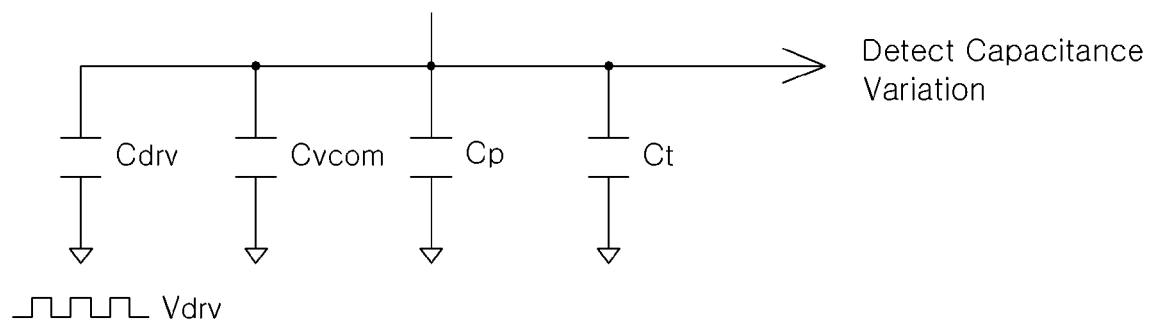
FIG. 2 is an equivalent circuit for detecting a touch at the time of occurrence of a touch.

Hereinafter, terms used in the specification will be described in brief and the invention will described more fully with reference to the accompanying drawings, in which exemplary embodiments of the invention are shown.

In the description of the embodiments, terms which will be described below are selected among generally used terms in consideration of functions in the embodiments of the present invention, and may vary with an intention of one skilled in the art and an operator, a custom, or an advent of new technologies. In some cases, terms may be chosen by applicants, and the meaning of the terms will be described in detail in the corresponding part of the specification. Accordingly, the definition of the terms should be determined based on overall contents of the specification in addition to the simple definitions commonly used in dictionaries.

It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof unless otherwise defined. In addition, the terms 'part,' 'unit,' and 'module' in the specification may represent a unit for processing at least one function or operation and may be a software component or a hardware component, and or a combination of hardware and software.

Although a few embodiments of the present invention will be described in detail with reference to the specification and drawings so that one of ordinary skill in the art can easily implement, the present invention is not limited to such embodiments. In the description of the embodiments, some detailed description irrelevant to the subject matter of the present invention will be omitted herein to avoid making the subject matter ambiguous, and the same reference numerals are used to designate the same elements throughout the specification.

Hereinafter, exemplary embodiments of the present invention will be described in detail with reference to the accompanied drawings.

First, a touch detection apparatus in accordance with an exemplary embodiment of the present invention will be described in detail with reference to FIGS. 3 and 4.

Figure 3:
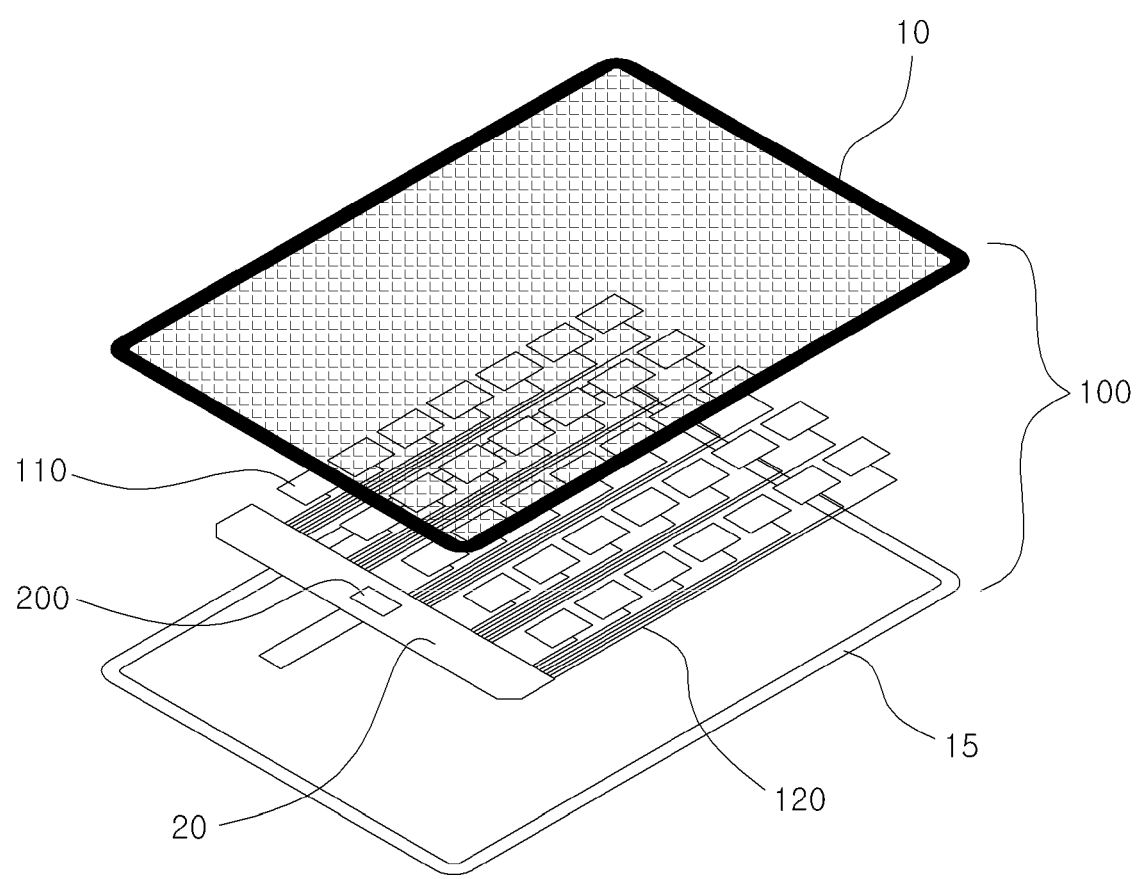
FIG. 3 is an exploded plan view illustrating a touch detection apparatus in accordance with an embodiment of the present invention.
Figure 4:
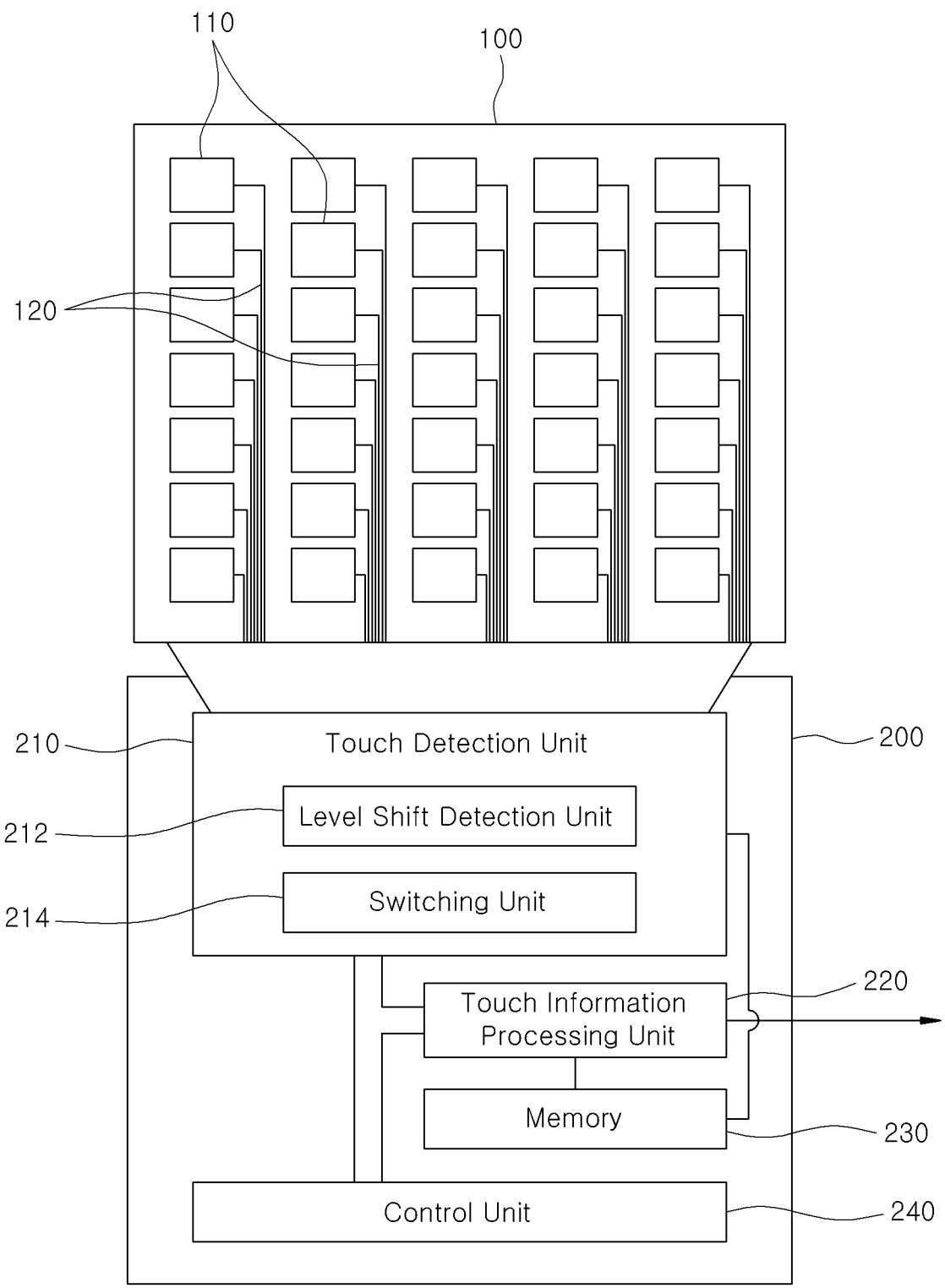
FIG. 4 is a block diagram for describing a configuration of a touch detection apparatus in accordance with an embodiment of the present invention.

FIG. 3 is an exploded plan view illustrating a touch detection apparatus in accordance with an embodiment of the present invention, and FIG. 4 is a block diagram for describing a configuration of a touch detection apparatus in accordance with an embodiment of the present invention.

Referring to FIGS. 3 and 4, the touch detection apparatus in accordance with the embodiment of the present invention includes a touch panel 100, a driving apparatus 200, and a circuit board 20 connecting the touch panel 100 to the driving apparatus 200.

The touch panel 100 includes a plurality of sensor pads 110 formed on a substrate 15 and a plurality of signal interconnections 120 connected to the sensor pad 110. The substrate 15 may be formed of a transparent material, such as glass or plastic films.

For example, each of the plurality of sensor pads 110 may be provided in a rectangular or lozenge shape, or may be provided in other shapes, such as a regular polygon. The sensor pads 110 may be arranged in the form of a matrix including polygons in adjacent to each other.

Each signal interconnection 120 has one end thereof connected to the sensor pad 110 and the other end extending to a lower edge of the substrate 15. The signal interconnection 120 has a significantly narrow line pitch of about several micrometers to several tens of micrometers.

The sensor pad 110 and the signal interconnection 120 may be formed of a transparent conducting material, such as indium-tin-oxide (ITO), Antimony Tin Oxide (ATO), indium-zinc-oxide (IZO), carbon nanotube (CNT), graphene, and so on. However, according to another exemplary embodiment, the sensor pad 110 may be formed of metal.

The sensor pad 110 and the signal interconnection 120 may be simultaneously formed by stacking an ITO layer on the substrate 15 through sputtering and then patterning the ITO layer through etching, for example photolithography etching. The substrate 15 may be provided using a transparent film.

Meanwhile, the sensor pad 110 and the signal interconnection 120 may be patterned directly on a cover glass 10. In this case, the cover glass 10, the sensor pad 110, and the signal interconnection 120 may be integrally formed with each other, so that the substrate 15 may be omitted.

The sensor pad 110 is an electrode patterned on the substrate to detect a touch input, and serves to form a touch capacitance Ct in cooperation with a touch means, such as a finger or an electric conductor.

In addition, the sensor pad 110 outputs a signal based on a touch state in response to an alternating voltage in a floating state after being charged with electric charges. For example, the sensor pad 210 outputs different level shift values based on an electric charge variation at the time of occurrence of a touch and an electric charge variation at the time of non-occurrence of a touch depending on a touch state of a touch input device in response to an alternating voltage that alternates at a predetermined frequency.

The driving apparatus 200 for driving the touch panel 100 may be formed on a printed circuit board or the circuit board 20, such as a flexible circuit film, but the forming of the driving apparatus 200 is not limited thereto. For example, the driving apparatus 200 may be mounted on a portion of the substrate 15 or the cover glass 10. The driving apparatus 200 may include a touch detection unit 210, a touch information processing unit 220, a memory 230, and a control unit 240. The driving apparatus 200 may be implemented as one or more integrated circuit (IC) chips, and the touch detection unit 210, the touch information processing unit 220, the memory 230, and the control unit 240 may be individually separated from each other, or may be implemented in combination of two or more thereof.

The touch detection unit 210 may include a plurality of switches and capacitors each connected to the sensor pad 110 and the signal interconnection 120. The touch detection unit 210 drives circuits for touch detection in response to a signal received from the control unit 240, and outputs a voltage corresponding to a touch detection result. In addition, the touch detection unit 210 may include an amplifier and an Analogue to Digital Converter, to convert, amplify, or digitize a difference in voltage variations of the sensor pad 110 to be stored in the memory 230.

The touch information processing unit 220 processes digital voltages stored in the memory 230 to generate required information, such as information about occurrence of a touch, a touch area, and touch coordinates.

The control unit 240 may control the touch detection unit 210 and the touch information processing unit 220, and include a micro control unit (MCU), and perform a predetermined signal processing by using firmware.

The memory 230 stores a digital voltage based on a difference in voltage variations detected by the touch detection unit 210, predetermined data used to detect a touch and calculate a touch area and touch coordinates, or data received in real time.

The touch detection apparatus may further include a charging means (not shown) and an alternating voltage generation means (not shown).

The charging means is connected to an output end of the sensor pad 110 to supply a charging signal Vb. The charging means may be a 3-terminal switching device performing a switching operation according to a control signal supplied to an ON/OFF control terminal, or may be a linear device for providing a signal according to a control signal, such as an OP-AMP. A touch capacitance Ct, a parasitic capacitance Cp, and a driving capacitance Cdrv acting on the sensor pad 110 are connected to an output end of the charging means. In a turn-on state of the charging means, when a charging signal Vb is applied to an input end of the charging means, Ct, Cdrv, Cp, and so on are charged. Thereafter, if the charging means is turned off, the signals charged in Ct, Cdrv, and so on are isolated in the charged state unless an additional discharge operation is performed. In order to stably isolate the charged signals, an input end of a level shift detection unit 212, which will be described later, may preferably have a high impedance state. However, if a touch input is observed while the signals charged in Cdrv and so on are being discharged, the charged signals are isolated in other ways, or the signals are quickly observed at the time of discharge initiation, there is no need to inevitably have a high impedance state at the input end of the level shift detection unit 212.

The electric charges charged in the sensor pad 110 at the time of turn-on of the charging means are isolated in response to turn-off of the charging means. Such an isolation of charges is referred to as a floating state. Electric charges of the charged signal isolated between the charging means and the level shift detection unit 212 have a voltage level varied by an alternating signal applied from outside. The voltage level varies depending on whether a touch has occurred or not. Such a level change before and after occurrence of a touch is referred to as a level shift.

The alternating voltage generation means applies an alternating voltage Vdrv that alternates at a predetermined frequency to the output end of the sensor pad 110 to vary the electric potential of the sensor pad 110. The alternating voltage generation means may generate clock signals having the same duty ratio, or alternating voltages having different duty ratios.

In addition, the alternating voltage generation means may include a common electrode (not shown).

The common electrode is an electrode to which a common voltage is applied in a display apparatus or an electrode serving in common in a display apparatus. A liquid crystal display (LCD), an example of the display apparatus, requires a common voltage to drive a liquid crystal. A small- and medium-sized LCD has an alternating voltage alternating at a predetermined frequency as a common voltage to reduce the current consumption, and a large-sized LCD has a DC voltage as a common voltage.

Meanwhile, the touch detection unit 210 further includes the level shift detection unit 212 and a switching unit 214.

The level shift detection unit 212 detects a level shift generated by an alternating voltage Vdrv in a floating state. Specifically, the level shift detection unit 212 measures a voltage variation of the sensor pad 110 at the time of non-occurrence of a touch and a voltage variation of the sensor pad 110 at the time of occurrence of a touch, to detect whether a level shift has occurred. That is, the electric potential of the sensor pad 110 is increased or decreased by an alternating voltage Vdrv applied from outside, and a voltage level variation at the time of occurrence of a touch is smaller than that of a voltage level variation at the time of non-occurrence of a touch. Accordingly, the level shift detection unit 212 detects a level shift by comparing voltage levels before and after a touch. In addition, the level shift detection unit 212 may acquire a touch signal based on a difference in the voltage variations.

The level shift detection unit 212 may be provided in a combination of various devices or circuits. For example, the level shift detection unit 212 may be provided in a combination including at least one of an amplifying device amplifying a signal of the output end of the sensor pad 110, an Analogue to Digital Converter (ADC), a Voltage to Frequency Converter (VFC), a Flip-Flop, a Latch, a Buffer, a Transistor, a Thin Film Transistor (TFT), and a comparator.

The switching unit 214 makes a difference in the voltage variations to have linearity with a touch capacitance Ct. The switching unit 214 may include a circuit including a plurality of switches, and makes a difference in the voltage variations to have a linear relationship with a touch capacitance Ct as the plurality of switches are individually switched on and off. For example, the switching unit 214 may include a first switch provided at an output end of the level shift detection unit 212 and a second switch provided at an input end of the level shift detection unit 212. However, the configuration of the switching unit 214 is not limited thereto.

The switching unit 214 may further include a control unit (not shown) to control a plurality of switches, and the control unit controls the second switch to be switched off when the first switch is in an ON state, and controls the second switch to be switched on when the first switch is in an OFF state.

The description of the switching unit 214 making a difference in the voltage variations to be linear with a touch capacitance Ct will be described later with reference to FIG. 5.

The touch detection apparatus measures a touch area of the sensor pad 110 based on a difference in the voltage variations. If the sensor pads 110 are disposed in the form of an isolated matrix, touch coordinates may be calculated by use of a touch area of each sensor pad.

Figure 5:
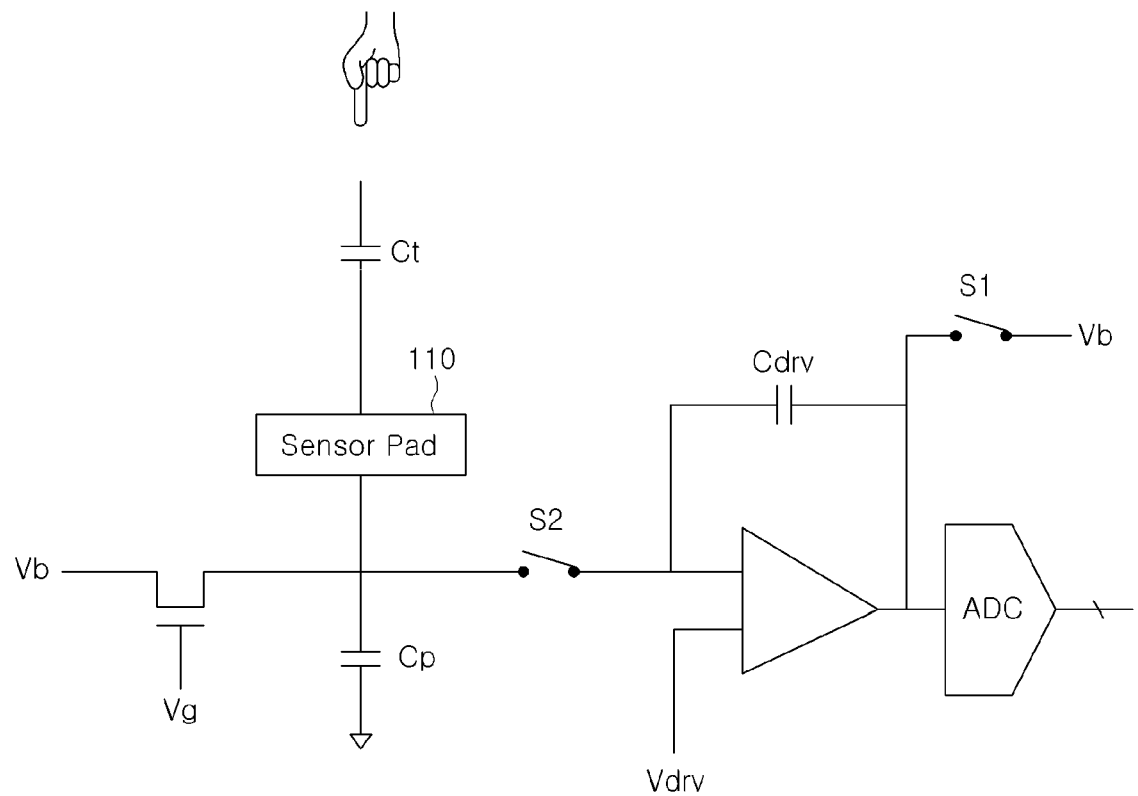
FIG. 5 is a circuit diagram illustrating a touch detection apparatus in accordance with an exemplary embodiment of the present invention.

FIG. 5 is a circuit diagram illustrating a touch detection apparatus in accordance with an exemplary embodiment of the present invention.

Referring to FIG. 5, the touch detection apparatus may include the sensor pad 110, a touch capacitance Ct, a parasitic capacitance Cp, a driving capacitance Cdrv, a transistor Q, an operational amplifier OPamp, and an ADC.

The sensor pads 110 are provided as a plurality of independent polygons disposed over the entire surface of the touch screen. Accordingly, if a touch area of each sensor pad is calculated, touch coordinates on the touch screen are calculated.

First, the terms used in FIG. 5 are defined as follows.

The touch capacitance Ct represents a capacitance formed between the sensor pad 110 and a touch means, such as a finger, when a user touches the sensor pad 110.

The parasitic capacitance Cp represents a capacitance accompanied by the sensor pad 110, that is, a type of parasitic capacitance formed by the sensor pad 110, the signal interconnection, and the display apparatus. The parasitic capacitance Cp may include random parasitic capacitances generated by the level shift detection unit 212, the touch panel, and the image display apparatus.

A common voltage capacitance Cvom represents a capacitance formed between a common electrode (not shown) of a display apparatus, such as an LCD, and a touch panel when the touch panel is mounted on the display apparatus. A common voltage Vcom (not shown), for example, a square wave is applied to the common electrode by the display apparatus. Meanwhile, the common voltage capacitance Cvom may be also a type of parasitic capacitance, and thus included in the parasitic capacitance Cp. The following description will be made on the assumption that the common voltage capacitance Cvcom is included in the parasitic capacitance Cp unless a common voltage capacitance is additionally defined.

The driving capacitance Cdrv is a capacitance formed on a path supplying an alternating voltage Vdrv in a predetermined frequency for each sensor pad 110. The alternating voltage Vdrv applied to the driving capacitance Cdrv is preferably a square wave signal. The alternating voltage Vdrv may be a clock signal having the same duty ratio. Alternatively, the alternating voltage Vdrv may have a different duty ratio. The alternating voltage Vdrv may be generated by a separate alternating voltage generation means, or may be generated by use of a common voltage Vcom.

The transistor Q may be provided as a field effect transistor for example. A control signal Vg is applied to a gate, a charging signal Vb is applied to a source, and a drain is connected to a signal interconnection (not shown). Alternatively, a source may be connected to a signal interconnection and a charging signal Vb may be applied to a drain. According to another exemplary embodiment of the present invention, another device may be used to perform switching rather than the transistor Q.

An input end of the operational amplifier has a high impedance state.

Referring to FIG. 5, a charging signal Vb and a control signal Vg are applied to the source and the gate of the transistor Q, respectively.

First, the following description will be made in relation to a case in which the sensor pad 110 is not touched by a touch means. When the control signal Vg applied to the transistor Q rises from a low voltage to a high voltage after the charging signal Vb rises up to 5V, for example, the transistor Q is turned on and thus the sensor pad 110 is charged with the charging signal Vb of 5V, and an output voltage Vo becomes the charging voltage Vb. Electric charges are charged in the touch capacitance Ct and the parasitic capacitance Cp by the charging voltage Vb. In this case, the transistor Q is turned on, so the alternating voltage Vdrv does not affect the output voltage Vo.

Thereafter, when the control signal Vg drops from a high voltage to a low voltage to turn off the transistor Q, the charged electric charges are isolated since the input end of the operational amplifier is in a high impedance state, which enables an electric potential at the output end of the sensor pad 110 to be maintained, so that a constant voltage Vo is maintained at the output end of the sensor pad 110. Such a state of having electric charges isolated in the charged state is referred to as a floating state. In this case, if the alternating voltage Vdrv applied to the driving capacitance Cdrv increases, for example, from 0 V to 5 V, a voltage level of the output voltage Vo of the sensor pad 110 is instantly increased, and if the alternating voltage Vdrv decreases from 5 V to 0 V, a voltage level of the output voltage Vo of the sensor pad 110 is instantly decreased. The increase and decrease in voltage level have a value varying depending on the connected capacitance. Such a phenomenon in which the increase or decrease in voltage level varies depending on the connected capacitance is referred to as a kick-back.

A voltage variation ΔVo of the sensor pad 110 by the driving capacitance Cdrv and the parasitic capacitance Cp at the time of non-occurrence of a touch is expressed as Formula 2 below.

$$\Delta V_o = \pm (V_{drvH} - V_{drvL})\left(\frac{C_{drv}}{C_{drv} + C_p}\right) \quad \text{[Formula 2]}$$

The following description will be made in relation to a case in which the sensor pad 110 is touched by a touch input device. At the time of occurrence of a touch, a touch capacitance Ct is formed between the sensor pad 110 and the touch input device, and accordingly, the touch capacitance Ct is added to the capacitance to be connected to the sensor pad 110 in addition to the driving capacitance Cdrv and the parasitic capacitance Cp, so that the voltage variation ΔVo of the sensor pad 110 is expressed as Formula 3 below.

$$\Delta V_o = \pm (V_{drvH} - V_{drvL})\left(\frac{C_{drv}}{C_{drv} + C_p + C_t}\right) \quad \text{[Formula 3]}$$

Herein, ΔVo represents a voltage variation of the sensor pad 110, VdrvH is a high level voltage of an alternating voltage, VdrvL is a low level voltage of an alternating voltage, Cdrv is a driving capacitance, Cp is a parasitic capacitance, and Ct is a touch capacitance.

When Formula 2 is compared with Formula 3, it is shown that a touch capacitance Ct is added to the denominator of Formula 3. In conclusion, a voltage variation ΔVo at the time of occurrence of a touch is smaller than a voltage variation ΔVo at the time of non-occurrence of a touch, and a difference between the voltage variations varies with the touch capacitance Ct. The difference in voltage variations before and after a touch is referred to as a level shift. In the present specification, the level shift may represent a digital value corresponding to a difference between the voltage variations ΔVo.

As shown in Formula 3, ΔVo does not have linearity with Ct. According to the exemplary embodiment of the present invention, the voltage variation ΔVo of the sensor pad 110 and the touch capacitance Ct are processed to have linearity with each other.

The following is a formula expansion by which the switching unit 214 allows a voltage variation ΔVo of the sensor pad 110 to have linearity with a touch capacitance Ct.

Referring again to FIG. 5, the touch detection apparatus includes a first switch S1 and a second switch S2, and the two switches S1 and S2 each may have a separate phase.

First, if the first switch S1 is switched on and the second switch S2 is maintained off, the driving capacitance Cdrv is initialized to be charged with an initial quantity of electric charges. Meanwhile, the touch capacitance Ct and the parasitic capacitance Cp are charged with the same charging voltage as the transistor is turned on. The electric potential of the driving capacitance Cdrv becomes a difference between a high level voltage and a low level voltage of an alternating voltage Vdrv of a node connected to an input end of the operational amplifier, that is, VdrvH−VdrvL, and a node connected to an output end of the operational amplifier becomes Vb.

When the quantity of electric charges charged in the touch capacitance Ct and the parasitic capacitance Cp is $Q_1$, the quantity of electric charges charged in the driving capacitance Cdrv is $Q_2$, and VdrvH−VdrvL is ΔVdrv, each quantity of electric charges is expressed as the follow Formula, that uses Q=CV, an equation for electric charges.

$$Q_1 = (C_t + C_p)V_b \quad \text{[Formula 4]}$$

$$Q_2 = C_{drv}(\Delta V_{drv} - V_b)$$

Vb is a charging signal supplied when the transistor is turned on, Cdrv is a driving capacitance, Cp is a parasitic capacitance, and Ct is a touch capacitance.

Meanwhile, if the second switch S2 is switched on and the first switch S1 is switched off, the electric charges charged in the touch capacitance Ct and the parasitic capacitance Cp are shared by the driving capacitance Cdrv. The electric charges are expressed as Formula shown below.

$$Q = \Delta V_{drv}C_t + \Delta V_{drv}C_p + C_{drv}(\Delta V_{drv} - V_o) \quad \text{[Formula 5]}$$

Cdrv is a driving capacitance, Cp is a parasitic capacitance, Ct is a touch capacitance, and Vo is an output voltage at the output end of the operational amplifier.

According to the law of conservation of electric charges stating that the total electric charge remains constant over time in a closed system, the quantity of electric charges Q at the time of ON state of only the second switch S2 is equal to summation of the quantity of electric charges Q1 charged in the touch capacitance Ct and the parasitic capacitance Cp and the quantity of electric charges Q2 charged in the driving capacitance Cdrv at the time of ON state of only the first switch S1, which results in $Q=Q_1+Q_2$, into which Formulas 4 and 5 are substituted so that the following Formula is produced.

$$\Delta V_{drv}C_1+\Delta V_{drv}C_p+C_{drv}(\Delta V_{drv}-V_o)=(C_1+C_p)V_b+C_{drv}(\Delta V_{drv}-V_b)$$

Cdrv∆Vdrv existing at both sides of the above Formula in common are deleted and the Formula may be expanded as below such that the left side has only Vo.

$$V_o = \left(\frac{C_{drv}-(C_t+C_p)}{C_{drv}}\right)V_b - \left(\frac{C_t+C_p}{C_{drv}}\right)\Delta V_{drv} =$$

$$V_b - \left(\frac{C_t+C_p}{C_{drv}}\right)V_b + \left(\frac{C_t+C_p}{C_{drv}}\right)\Delta V_{drv} = V_b + \left(\frac{C_t+C_p}{C_{drv}}\right)(\Delta V_{drv}-V_b)$$

The voltage variation ∆Vo of the sensor pad 110 corresponds to a difference between a charging voltage Vb supplied through the transistor and an output voltage Vo at the output end of the operational amplifier, and ∆Vdrv−Vb has a value of a constant voltage and thus is replaced with constant A as below.

$$\Delta V_o = \left(\frac{C_t+C_p}{C_{drv}}\right)A = \frac{C_t}{C_{drv}}A + \frac{C_p}{C_{drv}}A = \frac{C_t}{C_{drv}}A + B \quad \text{[Formula 6]}$$

Cp, Cdrv, and A are constants each having a predetermined value, and thus $$\frac{C_p}{C_{drv}}A$$

is replaced with constant B. According to Formula 6, ∆Vo is provided to be proportional to Ct. Accordingly, a level shift value, that is, the difference in ∆Vo before and after a touch is also proportional to Ct. In addition, an output value of the ADC having ∆Vo or a level shift value as an input is also linearly proportion to Ct, thereby ensuring linearity.

When compared to the conventional technology in which a result value of a voltage variation is inverse proportional to Ct placed at a site of a denominator of Formula 3 and thus Ct is difficult to be derived and a table having ADC output values and Ct values provided in one to one correspondence needs to be generated for each touch node, it is shown in Formula 6 according to the present invention that Ct is proportional to a voltage variation and thus easily derived.

In addition, a touch area formed by a touch means may be measured by substituting Ct into Formula 7 shown below.

$$C_t = \varepsilon \frac{S2}{D2} \quad \text{[Formula 7]}$$

In Formula 7, represents a permittivity obtained from a medium between the sensor pad 110 and a finger. When reinforced glass is attached to an upper surface of a substrate, the permittivity ϵ may be derived by multiplying a relative permittivity of the reinforced glass by the vacuum permittivity. S2 represents an area of the sensor pad 110 opposite to a finger. For example, if fingers cover the entire area of the sensor pad 110, S2 represents the entire area of the sensor pad 110, and if a finger covers a portion of the sensor pad 110, S2 represents an area reduced by an area which does not face the finger. D2 is a distance between the sensor pad 110 and a finger and represents a thickness of reinforced glass or any other protection panel placed on the upper surface of the substrate.

Accordingly, it is shown that Ct is proportional to an area of the sensor pad 110 opposite to the finger, and inverse proportional to a distance between the finger and the sensor pad 110. Accordingly, a touch capacitance Ct increases as a touch area increases, so that the ratio of the sensor pads 110 occupied by a finger is calculated.

When the sensor pads 110 are provided as independent polygons and disposed in the form of a matrix over the entire area of the touch panel, touch coordinates are calculated from the center of gravity composed by the occupation ratio of the sensor pads 110.

Accordingly, it is not only determined whether a touch signal is detected based on Ct, but also a touch area by the finger is obtained by substituting Ct into Formula 7.

The ADC may be included in the level shift detection unit 212 and if ∆Vdrv, that is, a difference between a high level voltage and a low level voltage of an alternating voltage is adjusted, the amount of current flowing during the ON time of the second switch S2 is adjusted, so that a gain of the operational amplifier is adjusted. Such an adjustment of gain of the operational amplifier is used to prevent deviation from an operating range of the ADC when Ct is small or large or to improve the resolution of the ADC.

In addition, the ADC keeps receiving an electric potential value of Vb as an input while the first switch S1 is in an ON state. Accordingly, if an output of Vb is provided to be 0 V through offset adjustment, there is no need to adjust the dynamic range of the ADC through an additional DAC. In addition, the offset adjustment of the ADC enables the effects of Cp to be canceled and an output of the ADC to be limited within a predictable range.

Figure 6:
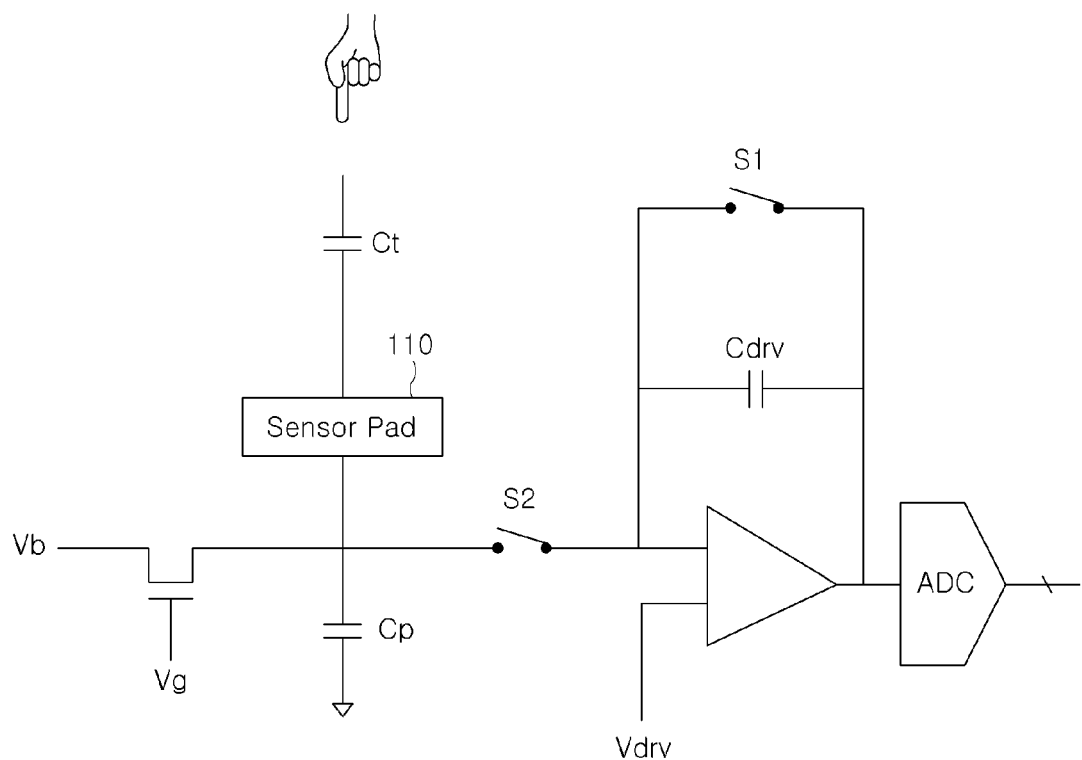
FIG. 6 is a circuit diagram illustrating a touch detection apparatus in accordance with another exemplary embodiment of the present invention.

FIG. 6 is a circuit diagram illustrating a touch detection apparatus in accordance with another exemplary embodiment of the present invention.

The circuit diagram on FIG. 6 shows a circuit according to another exemplary embodiment that makes a difference in the voltage variations to be linear with a touch capacitance Ct by including switches in the same manner as that of FIG. 5.

A first switch S1 and a second switch S2 are switched on/off in two phases in the same manner as the exemplary embodiment of FIG. 5. If the formula stating that charges at each phase remain the same is expanded with respect to Vo in the embodiment of FIG. 6, a linear relationship between Vo and Ct is derived.

$$V_o = -A(C_t+C_p)+\Delta V_{drv}$$

(Here, $A(V_b-\Delta V_{drv})/C_{drv}$)

Figure 7:
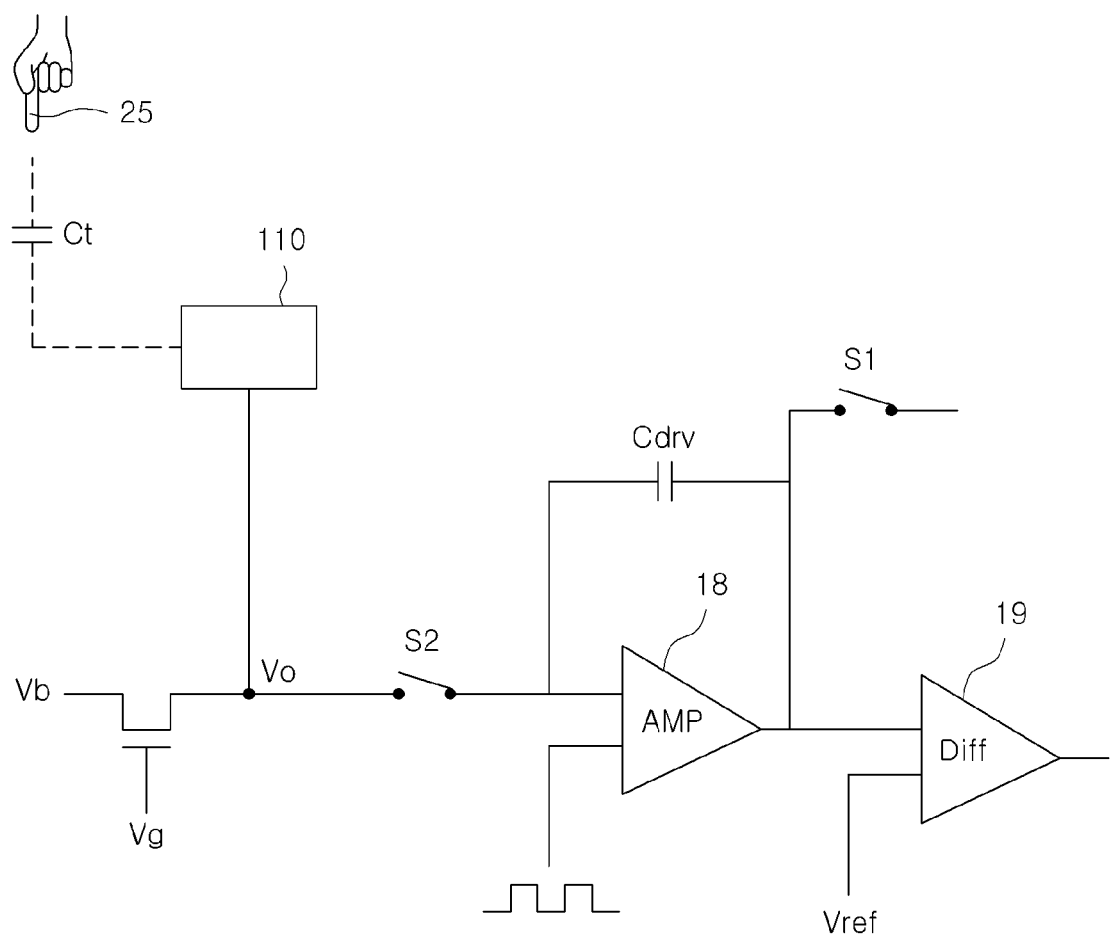
FIG. 7 is a circuit diagram illustrating a touch detection apparatus including a level shift detection unit that includes a differential amplifier.

FIG. 7 is a circuit diagram illustrating a touch detection apparatus including a level shift detection unit that includes a differential amplifier in an exemplary embodiment of the present invention.

Referring to FIG. 7, the level shift detection unit 212 further includes an operational amplifier 18 having an input end thereof connected to the sensor pad 110 and a differential amplifier 19 that differentially amplifies a difference between an output of the operational amplifier 18 and a reference voltage Vref. A first input of the differential amplifier 19 is a Vo value before or after a touch and a second input of the differential amplifier 19, that is, the reference voltage Vref is a Vo value at the time of non-occurrence of a touch at each sensor pad. The reference voltage is measured in real time and provided, or periodically measured and stored in a memory.

An output value of the differential amplifier 19 is a difference between voltage variations between and after a touch, that is, a level shift value. Accordingly, an ADC (not shown) may calculate a touch area by performing analogue-to-digital conversion on the output of the differential amplifier 19.

Although FIG. 7 illustrates an alternative example to the exemplary embodiment of FIG. 5, the touch detection apparatus may be applied to the exemplary embodiment of FIG. 6.

Figure 8:
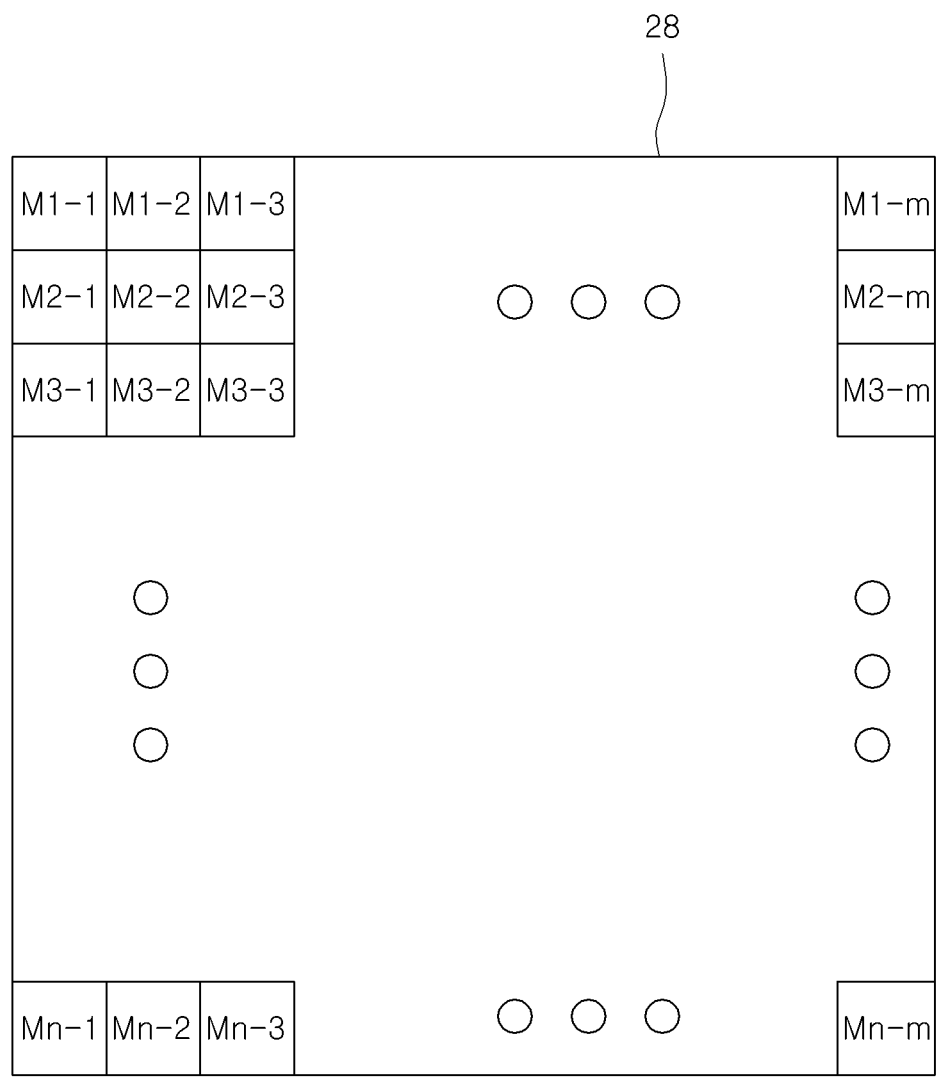
FIG. 8 is a view illustrating a structure of a memory unit storing information about a sensor pad 110 in accordance with an exemplary embodiment of the present invention.

FIG. 8 is a view illustrating a structure of a memory unit storing information about the sensor pad 110 in accordance with an exemplary embodiment of the present invention.

Referring to FIG. 8, when the sensor pads 110 are arranged in a dot-matrix form and have an m*n resolution, the memory unit consists of a table with m rows and n columns. The memory unit stores information about a signal at an output end of the sensor pad 110 or information about signals at output ends of the sensor pads 110 in a group (for example, sensor pads in the same row or the same column) arising when a touch does not occur. For example, an address of M1-1 may store an output value generated from a sensor pad 110 at the uppermost-leftmost corner at the time of non-occurrence of a touch, for example, a voltage variation (or an output value of an ADC digitized from the voltage variation) at the sensor pad 110. In addition, the memory unit may store a voltage variation of each sensor pad 110 at the time of non-occurrence of a touch or occurrence of a touch.

The parasitic capacitance Cp and the driving capacitance Cdrv may vary at each sensor pad 110 since there are limitations in designing the position of the sensor pad 110, the length of interconnection, and other external factors to be same with respect to the sensor pad 110.

However, according to the exemplary embodiment of the present invention, a signal at an output end at the time of non-occurrence of a touch (for example, a voltage) for each sensor pad 110 is stored and managed in the memory unit, so that touch is effectively detected even when the characteristics of the sensor pads 110 are different from each other.

Figure 9:
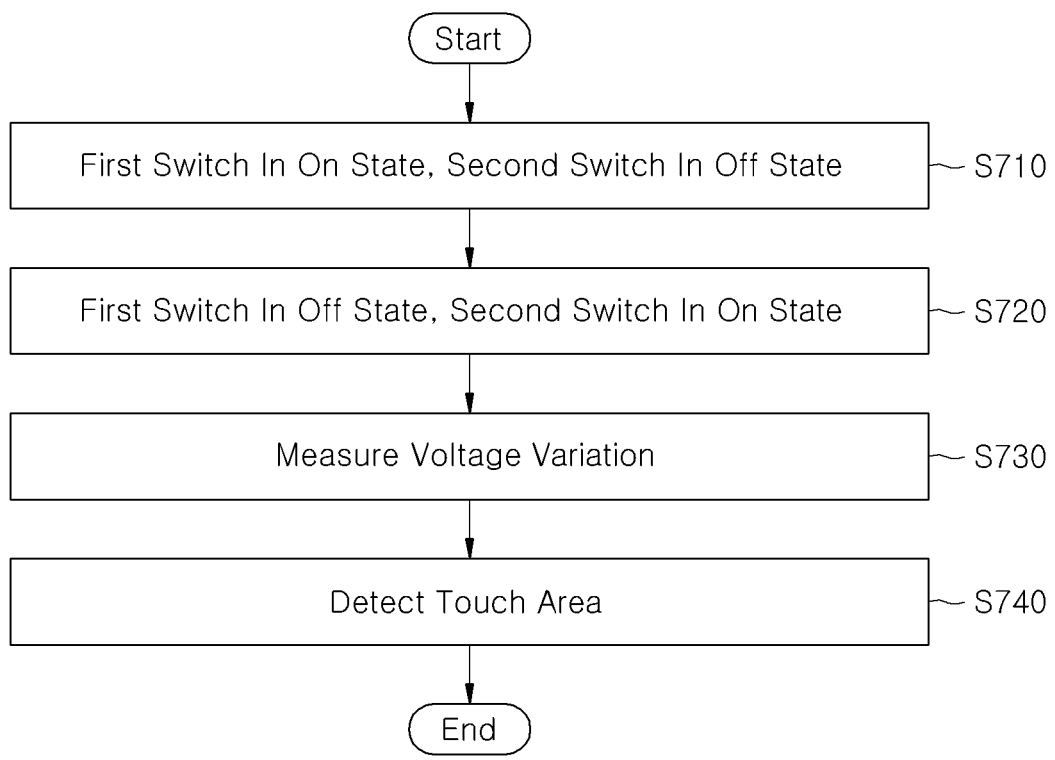
FIG. 9 is a flowchart showing a touch detection method in accordance with an exemplary embodiment of the present invention.

FIG. 9 is a flowchart showing a touch detection method in accordance with an exemplary embodiment of the present invention.

Referring to FIG. 9, in S710, the touch detection apparatus turns on the first switch S1 (ON) and turns off the second switch S2 (OFF) to cause the driving capacitance Cdrv to be initially charged (an initial charge may be 0), and allows the sensor pad 110 and the parasitic capacitance Cp to be charged with a charging signal and then turned off, thereby creating a floating state.

In S720, the touch detection apparatus turns off the first switch S1 (OFF) and turns on the second switch S2 (ON) to cause the driving capacitance Cdrv to be connected to the input end and the output end of the operational amplifier, and cause the input end of the operational amplifier, the sensor pad 110, and the parasitic capacitance Cp to be connected to each other. A voltage change arising in the sensor pad 110 causes a voltage change at the output end of the operational amplifier. In S730, the voltage change at the output end of the operational amplifier is measured.

In S740, the touch detection apparatus detects occurrence of a touch and a touch area based on a difference in voltage variations at the output end of the operational amplifier before and after a touch. That is, the touch occurrence and the touch area are detected based on a difference between a voltage variation at the output end of the operational amplifier at the time of non-occurrence of a touch and a voltage variation at the output end of the operational amplifier at the time of occurrence of a touch (a level shift).

In this case, the level shift value has a linear relationship with touch capacitance Ct or the touch area.

Although a few embodiments of the present invention have been shown and described, the above embodiments are for an illustrative purpose only, and the present invention is not limited thereto.

The image display method described above can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and so on. The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A capacitive touch detection apparatus, comprising:
   at least one sensor pad to output a signal based on a touch state in response to an alternating voltage in a floating state after being charged with an electric charge;
   an operational amplifier including a first input connected to an output of the at least one sensor pad and a second input to receive the alternating voltage;
   a level shift detection unit to detect a touch signal based on a difference between a voltage variation at an output end of the operational amplifier caused by the alternating voltage and a voltage variation at the output end of the operational amplifier caused by occurrence of a touch; and
   a switching unit including a first switch to control an electric potential between a first input end and the output end of the operational amplifier and a second switch to connect or disconnect the sensor pad and the first input of the operational amplifier, wherein the first switch and the second switch are switched on alternately so that the difference between the voltage variations has linearity with a touch capacitance.

2. The capacitive touch detection apparatus of claim 1, wherein the operational amplifier further includes a driving capacitance between the output end and the first input of the operational amplifier.

3. The capacitive touch detection apparatus of claim 1, wherein the switching unit further includes a control unit to control the first switch and second switch being switched on or off.

4. The capacitive touch detection apparatus of claim 1, wherein a touch area on the sensor pad is measured based on the difference in the voltage variations.

5. The capacitive touch detection apparatus of claim 4, wherein the sensor pad is disposed in the form of an isolated matrix, and touch coordinates are calculated from a region formed by the touch area.

6. A touch detection method, comprising:
(a) charging at least one sensor pad that forms a touch capacitance in cooperation with a touch input, and floating the sensor pad;
switching a first switch connected to driving capacitance on and a second switch connecting the sensor pad to the driving capacitance off to charge or discharge an initial electric charge in the driving capacitance;
(c) switching the first switch off and the second switch on to connect the sensor pad to the driving capacitance and apply an alternating voltage that alternates at a predetermined frequency to the sensor pad; and
(d) measuring a difference between a voltage variation caused by the alternating voltage at the time of non-occurrence of a touch and a voltage variation caused by the alternating voltage at the time of occurrence of a touch.

7. The touch detection method of claim 6, wherein the difference in the voltage variations is made a linear relationship with a touch capacitance by controlling a plurality of switches.

8. The touch detection method of claim 7, further comprising calculating a touch area based on the linear relationship.

* * * * *